Patented Dec. 11, 1951

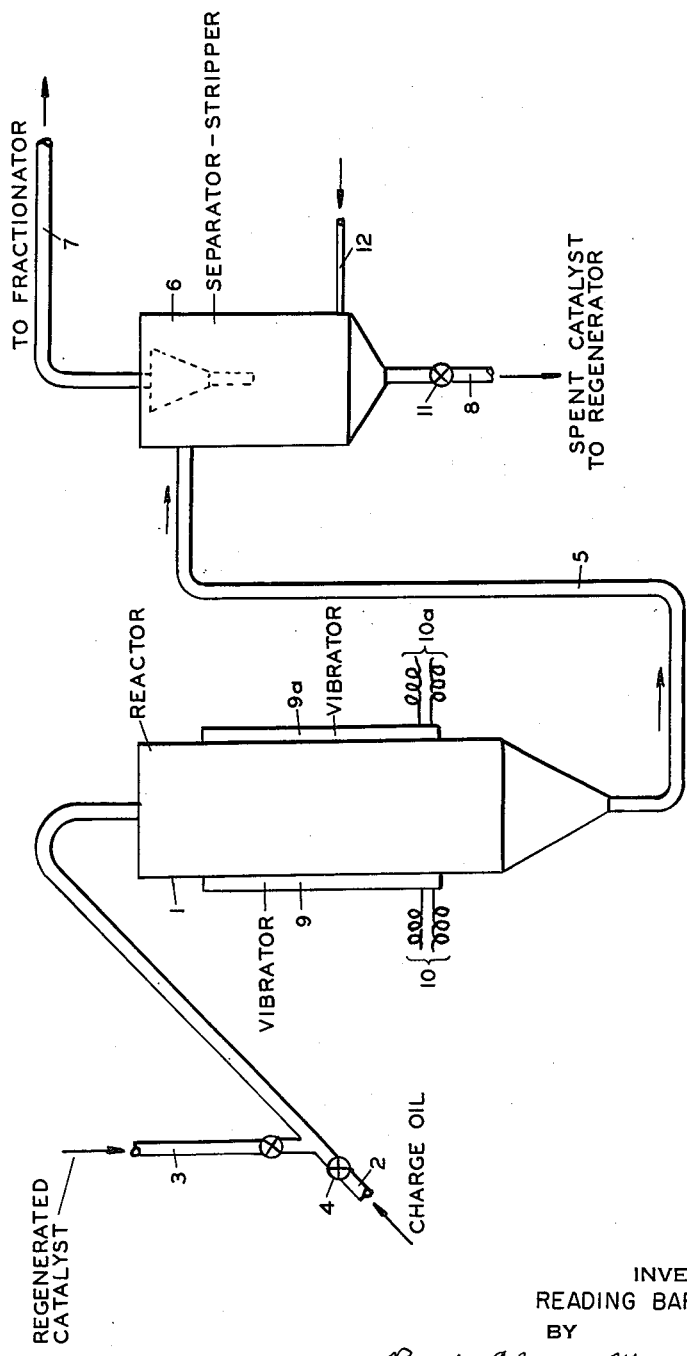

2,578,377

UNITED STATES PATENT OFFICE 2,578,377

CATALYTIC CONVERSION OF HYDROCARBONS WITH FINELY DIVIDED CATALYSTS UTILIZING SONIC VIBRATIONS

Reading Barlow Smith, Hammond, Ind., assignor to Sinclair Refining Company, New York, N. Y., a corporation of Maine Application June 24, 1947, Serial No. 756,782

2 Claims. (Cl. 196—52)

This invention relates to the pyrolytic conversion of hydrocarbons, and more especially to pyrolytic conversion processes involving the use of a finely divided catalyst.

The invention is especially applicable to conversion or hydrocarbon cracking processes of the general type wherein a finely divided catalyst is suspended in oil vapors at elevated temperatures in a reaction chamber usually called a reactor. In such processes it is considered necessary to maintain the catalyst particles agitated and fluidized in order to derive the maximum effect of the catalyst.

Generally speaking, the effect of the catalyst increases with concentration thereof. However, such increase in effectiveness is limited, due chiefly to channelling and to contamination of the catalyst particles. When the concentration of catalyst particles becomes excessive the phase becomes so dense that the hydrocarbon vapors flowing into the reactor merely force channels therethrough and are, therefore, not adequately subjected to the effect of properly distributed catalyst particles. This undesirable condition can, as is known in the art, be avoided to some extent by the proper design of the reactor chamber and by control of the velocity of the hydrocarbon vapors fed thereto, as well as of the proportion of catalyst introduced, by control of temperature and pressure, and other factors. The formation of the dense phase body of catalyst in the reactor may be avoided to better effect in accordance with the invention described in my copending patent application Serial No. 745,050, filed April 30, 1947, now abandoned.

The second of the mentioned problems, viz, the contamination of the catalyst particles, has proved more difficult of solution because after the catalyst particles have been in contact with the hydrocarbon vapors for a certain period a gas film is adsorbed to those particles, thus reducing the effectiveness of the catalyst.

The nearest approach to a solution of this problem has been to limit the dimensions of the reactor chamber so that the catalyst particles do not remain in the reactor longer than the period required to adsorb the gas film. It is evident that this is an avoidance rather than a solution of the problem, because it merely enforces a time limit on the active period for any given catalyst particle during its passage through the reactor.

The purpose of the present invention is to maintain the catalyst particles free, or substantially free, of gas film and simultaneously to lengthen the travel path of the individual particles through the reactor so as simultaneously to increase the catalytic effect of the particles and to increase the contact period of the particles with the hydrocarbon vapors. The several advantages above described are achieved in accordance with the invention by maintaining the catalyst-hydrocarbon vapor mixture in the reactor in the fluid phase and, during its passage through the reactor subjecting it to the action of compression waves of the sonic type of appropriate frequency.

The present invention will be more clearly understood from the following description taken together with the accompanying drawing which represents conventionally and diagrammatically a flow diagram of the operation.

In the drawing, the reaction zone is represented to include reactor 1 and a charging or elevator conduit 2. It is assumed that this reactor is sufficiently insulated or otherwise arranged to maintain the hydrocarbon vapors therein at a temperature of, say, between 600° and 1000° F. The preheated charge oil, viz, oil vapor in which is suspended the finely divided catalyst of, say, 200 to 600 mesh, enters the reactor through conduit 2 under the control of valve 4. By reason of the restricted cross-sectional area of the reaction zone relative to the charging rate, the catalyst is carried therethrough in suspension in the oil vapors without substantial precipitation of the catalyst so that no dense phase particles are formed in the reaction zone. The reactor 1 may, as indicated, comprise a vertically elongated cylindrical chamber high enough to provide a sufficient residence of the hydrocarbon vapors under reaction conditions in contact with the catalyst and to provide for the concurrent application of sonic vibrations thereto, as will be more fully described hereinafter.

From the reactor the catalyst and hydrocarbon vapors pass through line 5 to a separator-stripper 6, which may be of the cyclone type. From the separator 6 the vapors pass through lines 7 to a fractionator, not shown. Steam or other suitable stripping medium is injected into the lower portion of the stripper through line 12, passing upwardly therethrough, countercurrent to the downwardly gravitating catalyst, stripping the volatilizable hydrocarbons from the catalyst and passing therefrom in admixture with such hydrocarbon vapors from line 5.

In the upper portion of the separator-stripper 6 the catalyst particles are separated from the vapors by action of the cyclone separator. The separated catalyst then passes, under control of valve 11, from the separator-stripper 6 through line 8 to a regenerator, not shown. From the regenerator, as is common practice, the regenerated catalyst may be returned through line 3 to charging conduit 2.

More specifically, in accordance with the present invention, the reactor 1 is provided with one or more suitable vibrators 9, 9a, here shown fixed to or comprising part of a wall of the reactor. These vibrators may be of the piezoelectric type, such as a quartz crystal or of the equally well known magnetostriction type. Vibrators of other suitable types may likewise be employed. More recently developed types of magnetostriction oscillators appear to be preferable for the present purpose, chiefly because they are more rugged than quartz crystals, and are not so readily damaged by high temperatures. The frequencies attainable from the magnetostriction type appear to be sufficient, except under unusual circumstances. Suitable electric current to vibrate the vibrators 9, 9a, may be connected thereto through leads 10, 10a.

For the purposes of the present invention it is desirable that the sonic waves set up in the vapor-catalyst mixture within the reactor be of considerable power and preferably be of the travelling wave type. Two or more vibrators may be used, but if travelling waves are to result therefrom the frequencies of the vibrators must be so related to the spacing between vibrators, and the vibrators must be so disposed with respect to each other and to the walls of the reactor as to avoid standing waves. This can readily be achieved by adopting relative dimensions, etc., well known in the art. It is preferable that the direction of propagation of the sonic waves be effectively perpendicular to the normal path of travel of the catalyst through the reactor chamber.

The vibrating sources 9, 9a are illustrated as extending over most of the height of the reactor chamber 1. It will be evident that this is a desirable provision because it thus subjects the catalyst particles to vibration substantially throughout the entire length of their passage through the reactor. The vibrator means here shown at 9, 9a, may comprise as many vibrators as required. They may be spaced appropriately along or around the wall of the reactor, and connected to vibrate in synchronism or otherwise, as desired.

The frequency or frequencies of vibration will be chosen in any given case in accordance with the prevailing conditions and therefore cannot here be specified with any exactness. For example, the frequency will be dependent upon the particle size and mass. Although the invention is not limited thereto, the range of frequencies herein contemplated may comprise approximately 1,000 to 30,000 cycles per second, thus embracing the so-called ultra-sonic range as well as the audible range. As is usually the case in connection with oil cracking, the particle size of the catalyst, even though reasonably uniform at starting changes appreciably, tending to become smaller with use. For this reason it is frequently desirable to employ several oscillators spaced apart on the wall of the reactor and arranged to vibrate at different frequencies so that the particles of different sizes will be more effectively acted upon. It is desirable that certain types of vibrators be separated from the reactor chamber by suitable diaphragms.

Although the theory of operation is not entirely understood, it is believed that the vibrations or sonic waves cause the catalyst particles to vibrate or move about in a generally horizontal plane as they are otherwise caused to travel in a generally vertical direction through, and along the longitudinal axis of, the reactor chamber, with the result that the actual particle path is of an irregular or zig-zag course rather than an essentially straight line, as has been the case heretofore. This zig-zag course not only materially lengthens the total travel path of each particle, possibly as much as 100 or 200 times, thus maintaining the catalyst in contact with the vapor for a longer period, but also tends to free the surfaces of the particles from contamination such as gas film, not only by the sheer force of vibration, but also by repeated collisions of particles.

This invention is not restricted to the particular embodiment above described, but is applicable to various modifications of conversion processes involving the use of finely divided catalysts.

What is claimed is:

1. In a catalytic process for the conversion of hydrocarbons wherein a suspension of finely divided catalyst in the hydrocarbons in vapor phase and under conversion conditions is passed through a vertically elongated reaction zone, the improvement which comprises passing said catalyst and vapor phase hydrocarbons through said reaction zone in a longitudinal direction and simultaneously subjecting said catalyst to continuously generated sonic wave vibrations of the travelling wave type propagated in a direction generally perpendicular to said longitudinal direction.

2. The improvement according to claim 1, characterized in that a plurality of wave vibrations of different frequencies are simultaneously propagated in said reaction zone.

READING BARLOW SMITH.

REFERENCES CITED

The following references are of record in the file of this patent:

UNITED STATES PATENTS

| Number | Name | Date |
|--------|------|------|
| 1,738,565 | Claypoole | Dec. 10, 1929 |
| 2,112,643 | Baensch et al. | Mar. 29, 1938 |
| 2,163,649 | Weaver | June 27, 1939 |
| 2,303,083 | Kuhl | Nov. 24, 1942 |
| 2,360,787 | Murphree et al. | Oct. 17, 1944 |
| 2,364,145 | Huppke et al. | Dec. 5, 1944 |
| 2,394,651 | Alther | Feb. 12, 1946 |
| 2,429,751 | Gohr et al. | Oct. 28, 1947 |

FOREIGN PATENTS

| Number | Country | Date |
|--------|---------|------|
| 192,089 | Great Britain | Apr. 10, 1924 |
| 457,547 | Great Britain | Aug. 26, 1935 |
| 458,872 | Great Britain | Dec. 29, 1936 |
| 477,646 | Great Britain | Jan. 4, 1938 |

OTHER REFERENCES

Zemlyakov et al., Chemical Abstracts, vol. 33, 3920 (1939).